US007793777B2

(12) United States Patent
Parks

(10) Patent No.: US 7,793,777 B2
(45) Date of Patent: Sep. 14, 2010

(54) BELT INSTALLATION GUIDES

(75) Inventor: Bruce J. Parks, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 562 days.

(21) Appl. No.: 11/895,863

(22) Filed: Aug. 28, 2007

(65) Prior Publication Data

US 2009/0057103 A1 Mar. 5, 2009

(51) Int. Cl.
*B65G 21/00* (2006.01)

(52) U.S. Cl. ................. 198/861.1; 198/860.1; 198/617; 193/37; 399/121

(58) Field of Classification Search ................. 198/507, 198/617, 812, 813, 860.1, 860.3, 861.1; 271/198; 474/111, 130–141; 399/116, 121; 193/37
See application file for complete search history.

(56) References Cited

U.S. PATENT DOCUMENTS

| | | | | |
|---|---|---|---|---|
| 1,169,565 | A * | 1/1916 | Pepper | 474/130 |
| 6,049,682 | A * | 4/2000 | Goetzke et al. | 399/116 |
| 6,233,415 | B1 * | 5/2001 | Pang | 399/116 |
| 6,276,042 | B1 * | 8/2001 | Hammond | 29/446 |
| 6,459,871 | B2 * | 10/2002 | Kwak et al. | 399/116 |
| 6,712,199 | B1 * | 3/2004 | Brückner et al. | 198/810.03 |
| 6,792,231 | B2 * | 9/2004 | Maier et al. | 399/121 |
| 7,336,917 | B2 * | 2/2008 | Asaoka et al. | 399/116 |
| 7,353,937 | B2 * | 4/2008 | Ziegler | 198/810.03 |
| 7,450,883 | B2 * | 11/2008 | Asaoka et al. | 399/116 |
| 2003/0231898 | A1 * | 12/2003 | Asaoka et al. | |

* cited by examiner

*Primary Examiner*—Douglas A Hess
(74) *Attorney, Agent, or Firm*—James J. Ralabate

(57) ABSTRACT

A belt installation guide is disclosed which accommodates the loading of a new belt around drive rollers in a belt module assembly. The guide is placed opposite the end portions of the rollers, the belt is slipped over the guides and held by the guides until the belt is pushed over the rollers. Once in place over the rollers, a tension is exerted on the belt to make it taut over all of the rollers. The guide is removed from near the rolls after the belt is in place over the rollers. The guide when not in use is positioned in housings internal to the rollers, or in housings adjacent to the rollers. The guides are enabled to be removed or pulled out from these housings when ready for use in installing a belt in a belt module.

7 Claims, 9 Drawing Sheets

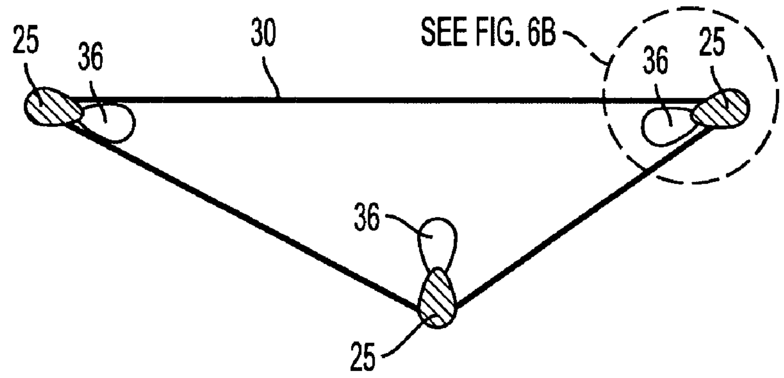
FIG. 6A
FIG. 6B-1
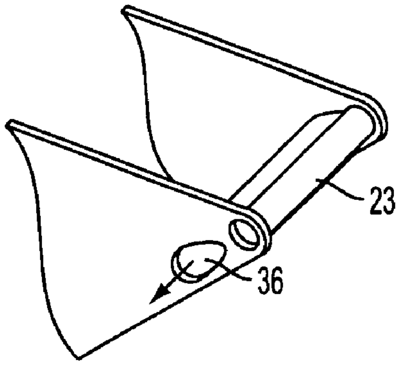
FIG. 6B-2
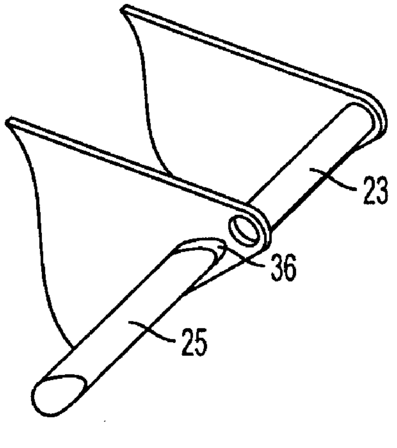

BELT INSTALLATION GUIDES

CROSS REFERENCES TO RELATED APPLICATIONS

Illustrated and disclosed in a co-pending application, Ser. No. 11/895,864 owned by the present assignee, is an application relating to belt removal guides that can be housed in the belt module or can be detachable from the belt module. The application based on Ser. No. 11/895,864 is filed in the U.S. Patent and Trademark Office on the same date as the present application which is based upon Ser. No. 11/895,863. The disclosure of Ser. No. 11/895,864 is totally incorporated herein by reference.

This invention relates to belt comprising systems and, more specifically, to a belt installation guide in image-carrying and other roller-belt apparatus.

BACKGROUND

While the present invention of belt installation guides can be effectively used in a plurality of different belt configurations, it will be described, for clarity, as used in electrostatic marking systems such as electrophotography.

By way of background, in marking systems such as Xerography or other electrostatographic processes, a uniform electrostatic charge is placed upon a photoreceptor belt or drum surface. The charged surface is then exposed to a light image of an original to selectively dissipate the charge to form a latent electrostatic image of the original. The latent image is developed by depositing finely divided and charged particles of toner upon the belt or drum photoreceptor surface. The toner may be in dry powder form or suspended in a liquid carrier. The charged toner, being electrostatically attached to the latent electrostatic image areas, creates a visible replica of the original. The developed image is then usually transferred from the photoreceptor surface to a final support material such as paper and the toner image is fixed thereto to form a permanent record corresponding to the original.

In these electrostatic marking systems, a photoreceptor belt or drum surface is generally arranged to move in an endless path through the various processing stations of the Xerographic process. Sometimes, as noted, the photoreceptor or photoconductor surface is in the form of an endless belt and in other systems it is in the form of a drum. In this endless path, several Xerographic-related stations are traversed by the photoconductive belt or drum, become worn and in several of these stations various belt configurations in addition to photosensitive belts are used such as transfer belts, pre-fuser transport belts, intermediate transfer belts and the like. Each of these belts is exposed to friction and moved by rollers that provide the belt movement to accomplish the belt purpose. After a while, the belt needs to be replaced. Since the photoreceptor surface is reusable when the toner image is transferred to a final support material such as paper, the surface of the photoreceptor is constantly abraded and cleaned by a blade and/or brushes and prepared to be used once again in the marking process.

Image-carrying belts used in color printing processes can be especially difficult to replace and install. In some machines, the horizontal intermediate transfer belt is over 6-10 feet long. Belt installation requires careful alignment with the belt module to prevent belt damage. At even longer belt lengths, the replacement operation is extremely difficult to install without belt damage occurring.

Even in monochromatic marking systems that use shorter belts for various functions, extreme care must be taken not to damage the belts during installation. In some instances, the belts are constructed of thin flexible polymeric materials that can easily scratch or be damaged during belt replacement or even during original installation.

SUMMARY

Embodiments of belt installation guides of this invention provide belt protection and enable easy alignment during the belt installation process. As color stations are added to the marking systems, belts get longer and the need for guides are greater. Pull out telescoping guides that are built into or adjacent to the rollers of a belt module save time and are easy to use. These pull out or telescoping guides in one embodiment reside inside drive or other roller housing and in another embodiment reside in a housing adjacent to the roller. They are easily pulled out when ready to be used and reinserted into these housings when not in use.

The embodiments herein therefore provide belt guides that fit into housings in hollow rollers or housings adjacent rollers of belt modules of products that have long transfer belts, especially those in excess of 10 feet in overall length. The installation of these long belts is difficult due to their size and scope. The installation requires care because of the likelihood of damage to the new belts being installed. It is especially difficult in applications that have the transfer belt module mounted horizontally. Therefore, the embodiments of this invention provide the incorporation of belt guides that are telescopically housed in rollers of a belt module, or in housings adjacent these rollers, or both. These internally-housed guides become important, especially if spacing becomes an issue. The guides would protrude toward the front of the machine from the housing at two or more roller positions providing a pre-staging area for the belt. The belt would then be draped in a position close to the actual belt housing but without the clearance issues. The belt would then be manually tensioned as it is slid over the rollers of the belt module. After installation, the guides would be reinserted into their housings in their inactive positions. These guides can also be used for removal of the belt but belt damage is not as great an issue then. An alternative to internal installation, is to mount the belt module on rails so that the belt module can be moved out of the machine for easy belt mounting using the present invention.

The embodiments of the present invention, as earlier noted, can be used to replace any belt in any type belt system. For clarity, these embodiments will be described in relationship to an electrostatic marking system, both color and monochromatic. The belts can be of any construction and for any use such as photosensitive belts, insulating belts, transfer belts, cleaning belts and mixtures thereof.

BRIEF DESCRIPTION OF THE DRAWINGS

FIGS. 6A and 6B-1-6B-4 illustrate the embodiment where the guide pockets are located adjacent to the rollers in the belt module.

DETAILED DISCUSSION OF DRAWINGS AND PREFERRED EMBODIMENTS

Figure 1:
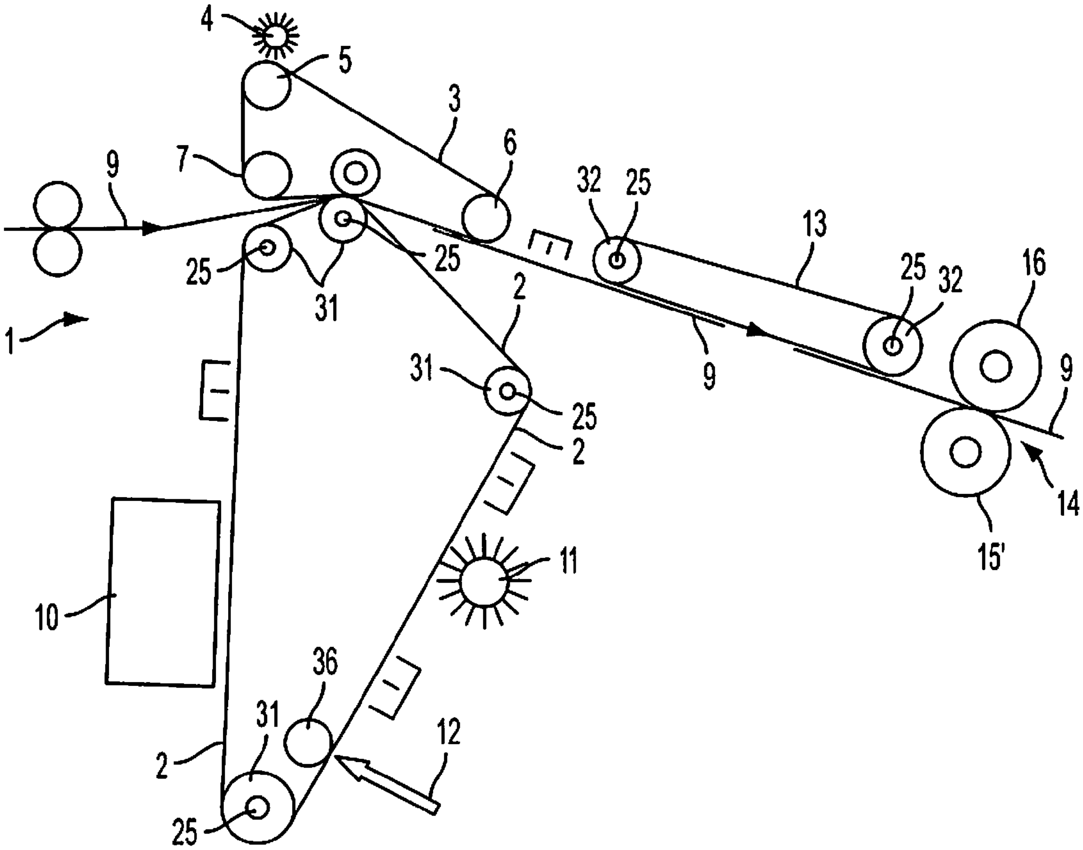
FIG. 1 PRIOR ART
FIG. 1 is a typical monochromatic marking system using belts for various purposes.

In FIG. 1, a complete electrostatic marking system 1 using different belts and rollers is illustrated having a photoconductive belt 2, a transfer belt 3, a transfer belt cleaning brush 4, transfer belt rollers 5, 6 and 7 upon which the transfer belt 3 travels. The transfer belt cleaner brush (ESB) 4 is positioned over conductive grounded roller 5 where transfer belt 3 passes. A paper or paper path 9 is designated where the paper is transported between transfer belt 3 and photoconductor belt 2. A developer housing 10, a photoconductor cleaning brush 11 and exposure station 12 are shown. A pre-fuser transport belt 13 is depicted as it provides means for transport of the paper 9 to the fuser station 14. Fuser station 14 is made up of a fuser roll 15 and a pressure roll 16. Rollers 31 are each used to support the photoconductive belt 2 and rollers 32 are used to pre-fuser transport belt 13. Each of belts 2, 3 and 13 can be replaced using belt guides of this invention. Each of the rollers 5, 6 7, 31 and 32 contain internally therein a pullout guide 25 of this invention that is used to change the belts these rollers are supporting. Rather than positioned in the rollers, guides 25 can be positioned in housings adjacent the rollers as shown at 36. For clarity, only one guide pocket 36 is shown in FIG. 1; however, housings 36 will be positioned next to each roller as shown in FIG. 5.

Figure 2:
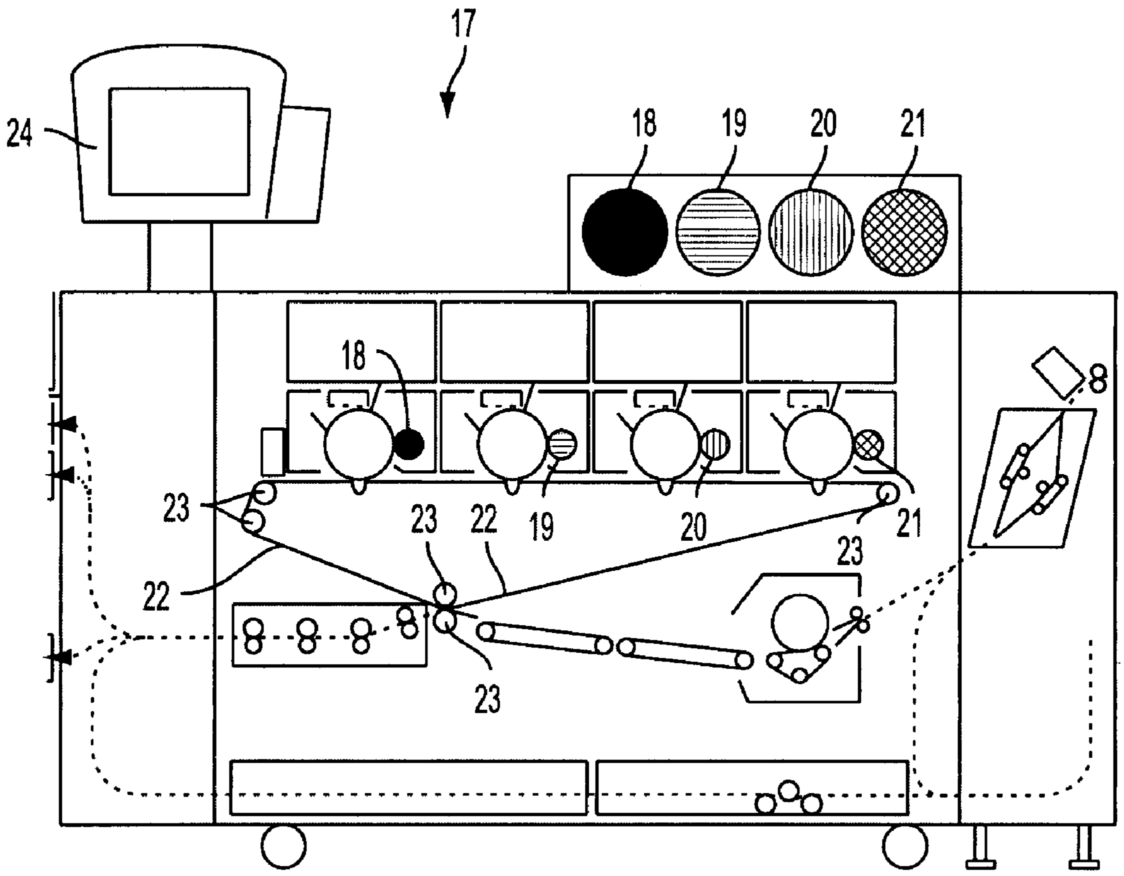
FIGS. 2 and 3 illustrate a electrostatic color system using an intermediate transfer belt between color stations.
Figure 3:
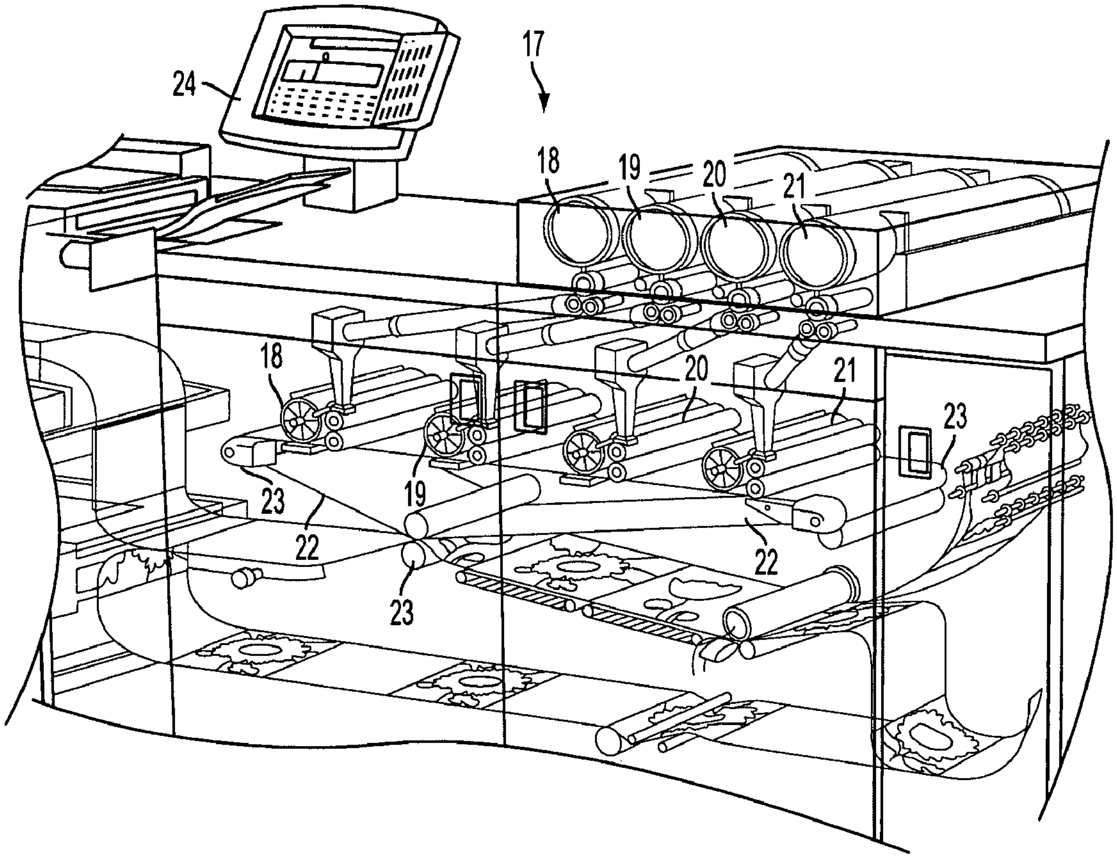

In FIG. 2, a front view of a color marking system 17 is illustrated having four color marking stations, a black marking station 18, a cyan marking station 19, a magenta marking station 20 and a yellow marking station 21. Traveling through each of these marking stations is an intermediate transfer belt 22 that travels around belt rollers 23. Rollers 23 each contain a pullout guide 25 (not shown) of this invention as shown in FIG. 4. These FIGS. 2 and 3 illustrate the type of belt-roller color systems that can use the belt installation guides of this invention. Guides 25 can be housed in rollers 23 or in housings adjacent rollers 23 as shown in FIG. 5.

In FIG. 3, a perspective view of the FIG. 2 color marking system is illustrated having a control panel 24 and marking or coloring stations. Traveling through these marking stations is an intermediate transfer belt 22 having rollers 23 around which belt 22 travels. The belt installation guides 25 are each movably housed within rollers 23. At least one of these rollers 23 is powered to move belt 22. The other components of color system 17 are unimportant as they relate to the present invention. Belt 22 can be lengthy and difficult to replace, however the use of the belt installation guides of this invention provides an easy, convenient and safe way to replace this belt 22.

Thus, FIG. 1 illustrates a monochrome marking system where the telescoping installation guides 25 shown in FIG. 4 can be used and FIGS. 2 and 3 illustrate a more complex color system where the pullout or telescoping installation guides 25 of this invention can be used.

The cross-sectional shape of the pullout guides 25, for clarity, are shown to be tubular and elongated with a circular cross-section. However, a circular configuration is not necessary. Circular is advantaged from a commonality perspective but the main requirement is for the surfaces that will be in contact with belt 22 to be without any sharp edges or points that could damage the belt 22. Any shape of pullout guides 25 that will accommodate loading a belt 22 using the guides 25 of this invention are included within the scope of this invention. The present pullout guides 25 is used in a method of installing a belt in a belt module of an electrostatic marking or other machine.

In an embodiment, the last step comprises returning the guides 25 to a position inside the rollers. Also, after transfer of the belt from the guides to the rollers, a tension is exerted upon the belt to thereby secure the belt tightly around the rollers. To minimize any belt damage, the guides have chamfered or rounded end portions to also facilitate easy transfer of the belt to the rollers. In an embodiment as a first step, the belt module is moved out of the machine. This method is especially useful to replace belts in an electrostatic marking apparatus.

In FIG. 4, a belt 22 installation method of an embodiment using the belt guides 25 of this invention is illustrated. A drive or other roller 23 is shown with a hollow interior 33 adapted to house a pullout guide 25. Illustrated is an elongated tubular guide 25 having a circular cross section. However, any guide structure may be used that is suitable for belt installation. The end of guide 25 that is closest to the roll 23 (when in use) has a belt guide ramp 34 that facilitates sliding a belt 22 from the guide 25 onto the roller 23. Belt module side plates 35 are shown positioned on the end portions of roller 23. These plates 35 provide locating features for all of the belt module components that span from the front to the back of the belt module, for example the rollers 23.

Figure 4A:
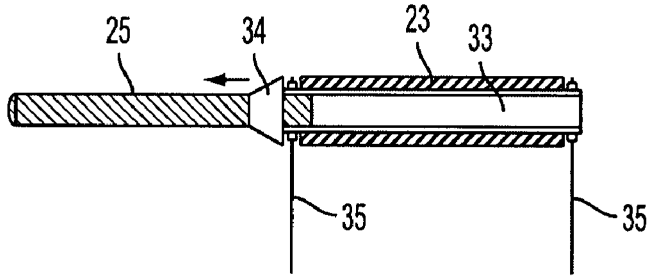
FIGS. 4A-4D illustrate an embodiment where the telescoping belt guides are housed in rollers and subsequently extended for installation use.
Figure 4B:
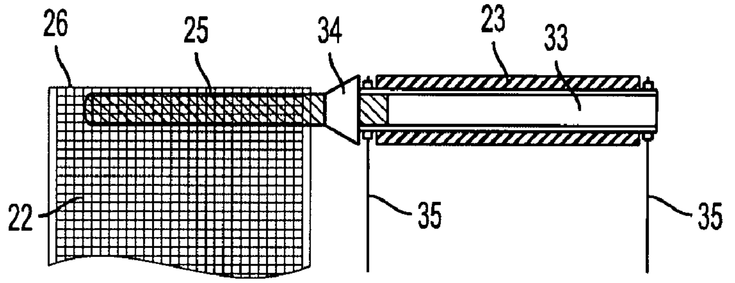
Figure 4C:
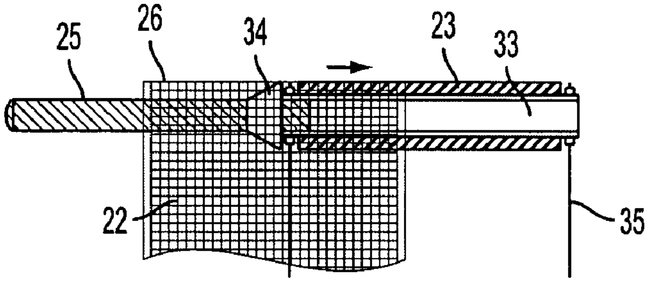
Figure 4D:
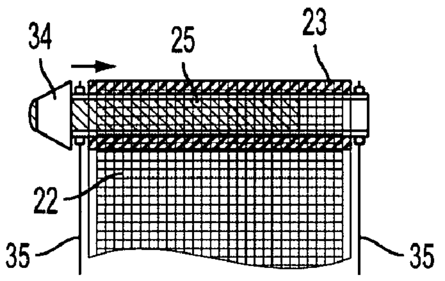

In the step sequence shown in FIG. 4A, the belt guides 25 are pulled out from the drive (or other) roller 23. A belt 22 is placed onto the extended belt guide 25 as shown in FIG. 4B. The belt 22 is manually tensioned to flatten the top span 26 of the belt 22. In FIG. 4C, the belt 22 is pushed inwards over the roller 23 allowing the belt 22 to ride up the belt guides ramp 34 onto rollers 23. In FIG. 4D, the belt 22 is finally positioned on the roller 23 and engage a belt module tensioning mechanism (not shown for clarity) to remove any slack in the belt 22. As the final step of FIG. 4D, the belt guide support 25 is pushed back into the hollow portion 33 of the roll 23 and stored until ready for use in another belt installation.

Figure 5A:
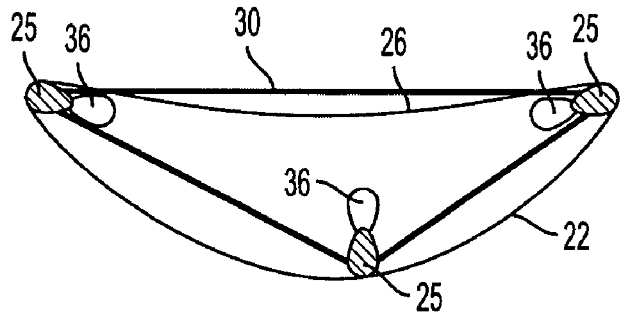
FIGS. 5A-5E illustrate belt installation steps using the belt guides as they are extended from the housings adjacent to the rollers.
Figure 5B:
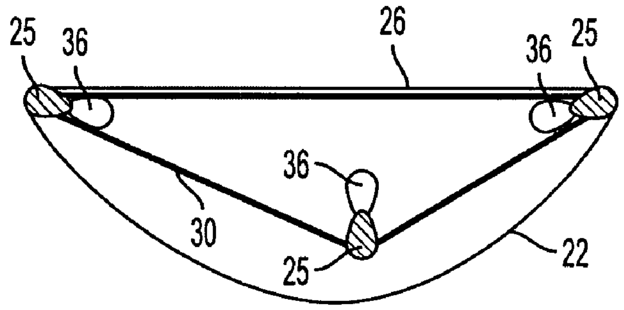
Figure 5C:
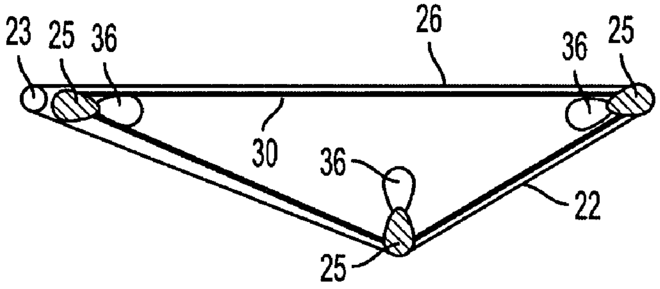
Figure 5D:
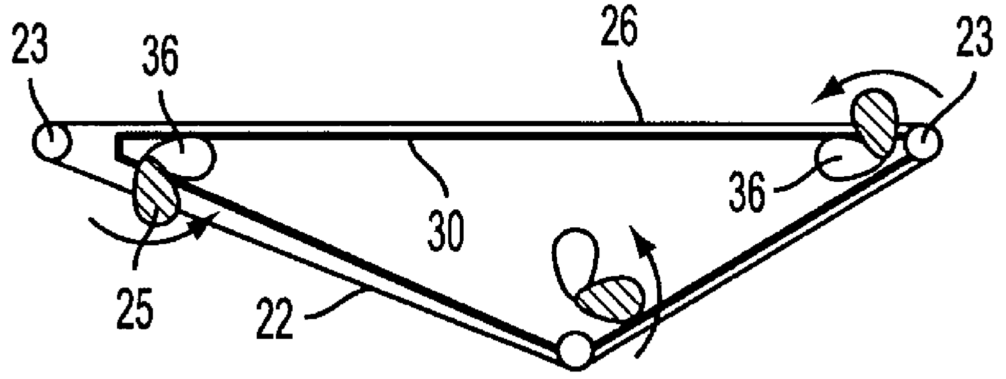
Figure 5E:
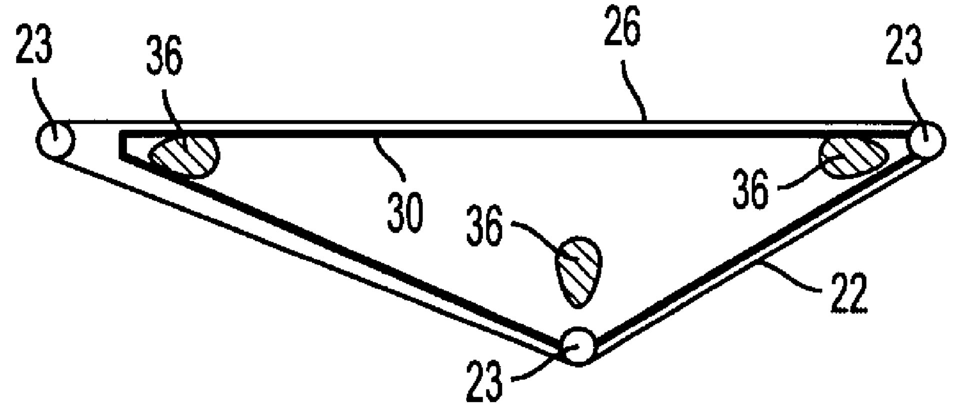

In FIGS. 5A-5E, a belt installation method of a second embodiment using the belt guides 25 of this invention is illustrated. The belt guides are located in a pocket next to the rollers 23 (rather than internally of rollers 23 as shown in FIG. 4A-4D). The steps sequentially are shown in FIGS. 5A-5E. In a first step of FIG. 5A, the belt guides 25 are pulled out of the pockets 36 next to the rollers 23 and guides 25 are rotated into position to support a belt 22. The belt 22 is loosely draped onto the belt guide support 25. The next step as shown in FIG. 5B is to manually tension the belt 22 to flatten the top belt span 26 and push the belt 22 inwards and onto the rolls 23 of the belt module. In FIG. 5C, the belt position is finalized on the drive (or other) rollers 23 and engages a belt module tensioning mechanism (any suitable mechanism may be used such as spring-loaded tension, etc.) to remove any slack in the belt 22. In FIG. 5D, the belt guides 25 are rotated so they can be pushed back, in FIG. 5E, into their pockets 36 next to the rollers 23 for storage. The belt 22 is now securely placed on rollers 23 for use in the belt module 30.

Figures 3, 6B:
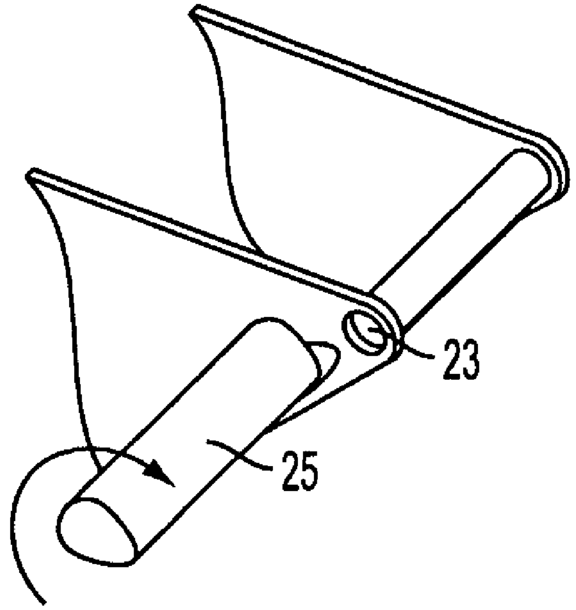
Figures 4, 6B:
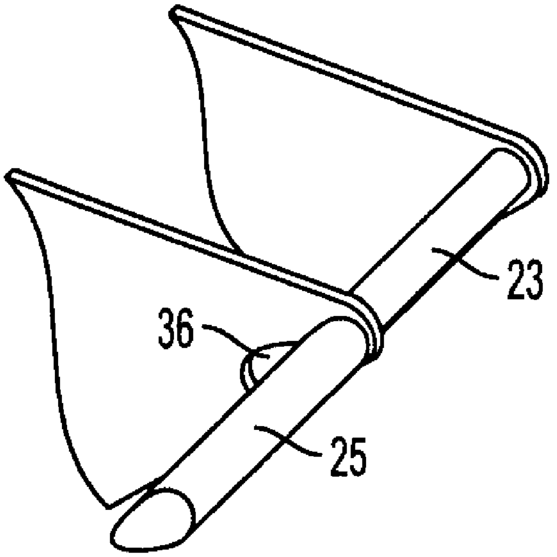

In FIG. 6A a front view of the arrangement is shown where the guide pockets 36 are located adjacent rollers 23. The belt 22 is draped in this embodiment over guides 25 that have been pulled out from pockets 36. In FIGS. 6B-1-6B-4 an enlarged illustration of this front arrangement is shown as guide 25 is sequentially removed or pulled out from pocket 36. Note that guides 25 in this embodiment, the cross section of guides 25, are tear-drop shaped, not round. After installation, guides 25 are reinserted into pockets 36 for future use as shown in FIGS. 6B-1.

Figure 7A:
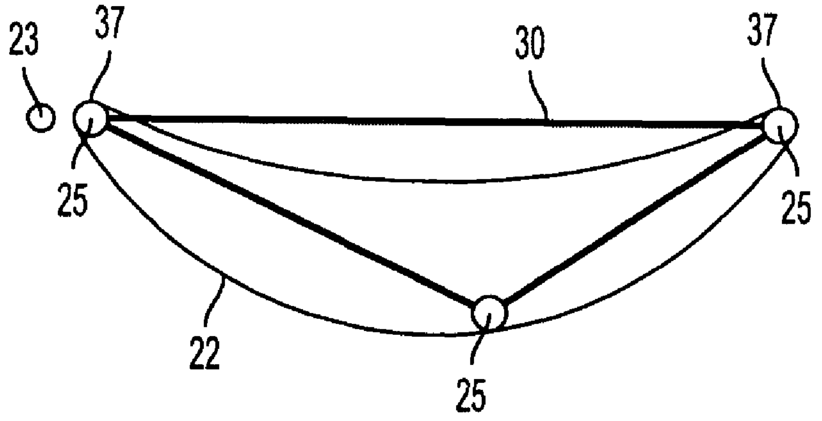
FIGS. 7A and 7B illustrate the use of handling tubes when installing a belt using both the belt guides and the handling tubes.
Figure 7B:
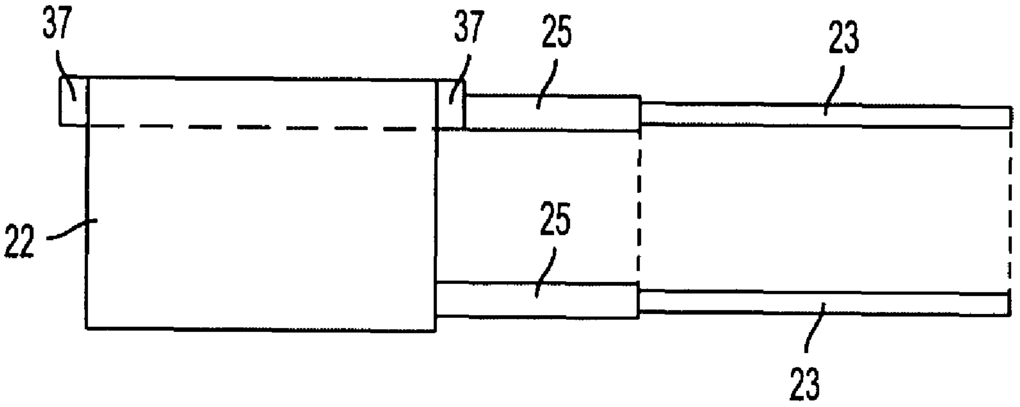

In FIG. 7A and FIG. 7B, the use of belt handling tubes 37 in the belt installation is shown. When belts 22 are shipped to the customer, they are often wrapped around cardboard tubes 37 within the shipping box. An operator may choose to handle a belt 22 by gripping a handling tube 37 in each hand and carrying the belt 22 with it draped over each handling tube 37. The belt guides 25 can be designed so the operator can slide the handling tubes 37 onto the belt guides 25 and then continue installing the belt 22 on rollers 23 as before as shown in FIGS. 5A-5E. After the belt is installed, the handling tubes 37 can be removed and discarded.

In summary, the present embodiments provide a belt installation guide for use in installing or removing a belt(s) from a belt module assembly. The belt is adapted to be movably positioned around at least two movable rollers in the module. The guide is telescopically housed when not in use in a housing in the module is enabled to be pulled out of the housing when in belt installation use. This housing is selected from the group consisting of a housing within a hollow of the rollers, a hollow housing positioned adjacent the rollers, and mixtures thereof. The guide is enabled to be moved adjacent the rollers so as to transfer the belt from the guide to the rollers. The guide has a slightly larger cross sectional shape than the rollers, and has chamfered or rounded end portions to prevent belt damage upon installation. In one embodiment, the guide has an elongated tubular configuration and is enabled to facilitate transfer of a belt to a tubular roller.

As shown in the drawings in an embodiment the guide is positioned in a hollow housing adjacent to the rollers and is enabled to be positioned in substantial alignment with the rollers when transferring a belt from the guide to the rollers. Also shown in the drawings is an embodiment where the guide when not in use is located in a hollow housing in the rollers. The guide is adapted to be pulled out from the hollow housing of the rollers when in use in installing a belt around the rollers. If the guide when not in use is located in a hollow housing positioned adjacent to the rollers, it can easily be pulled out from the hollow housing and placed in alignment with the rollers when in use in installing a belt around the rollers.

Thus, the guide is enabled to be moved in alignment with and away from the rollers respectively when in use and when stored in said housings and not in use. A use in one embodiment is to install a belt in an electrostatic marking system. The belt installation guide when used in an electrostatic marking system is enabled to facilitate transferring a belt in a belt module from the guide to rollers in the module. The rollers are positioned in the module to support an endless belt when the belt is operational. At least one of said rollers is enabled to move the belt around the rollers in a continuous fashion. The guide has a housing selected from the group consisting of a housing within a hollow in said rollers, a hollow housing positioned adjacent to said rollers, and mixtures thereof.

As earlier noted, the guides are configured so as to accommodate transfer of a belt to the rollers with a minimum of belt damage. The present embodiments include the guide structure and a method of installing the belt in a roller comprising belt module of an electrostatic marking apparatus. The method comprises the following steps: providing a sufficient number of installation guides to aid belt installation onto all rollers in the module, removing the guides from their housings within the module, moving the guides into service position with the rollers, loosely draping a belt onto the guides, slide the belt inboard onto the belt from the guides, engage a belt-tightening mechanism to securely attach the belt around the rollers, and in a last step, move the guides away from the rollers in a standby position in the housing.

A last step in an embodiment comprises reinserting said guides in a hollow housing in the rollers, or adjacent the rollers. In an embodiment as a first step the belt module is moved out of the marking machine for easier access to any belt and rollers. In a method, the marking machine is an electrostatic marking apparatus selected from the group consisting of monochromatic marking systems, color marking systems, and mixtures thereof.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A belt module of an electrostatic marking apparatus comprising:

at least two movable rollers configured to move a belt around said rollers, positioned and built in adjacent each said rollers are hollow pockets containing movable belt guides, said belt guides configured to be moved out of and into said hollow pockets, when said belt is being installed said belt guides are configured to be pulled out of said hollow pockets, and placed adjacent said rollers, after said belt is installed said belt guides are configured to be pushed back into said hollow pockets for storage and future use.

2. The belt module of claim 1 comprising a belt module tensioning mechanism, said tensioning mechanism configured to remove any slack in said belt.

3. The belt module of claim 1 wherein said pockets and said belt guides have a tear-drop shape cross section.

4. The belt module of claim 1 wherein said belt guides are positioned in said pockets adjacent to said rollers and configured to be positioned in substantial alignment with said rollers when transferring a belt from said guides to said rollers.

5. A method of installing a belt in a roller comprising belt module of an electrostatic marking apparatus which comprises the following steps:

providing an equal number of installation guides and hollow pockets adjacent said rollers containing said guides as are rollers in said module, removing said guides from hollow pockets within said module, moving and rotating said guides into service position adjacent said rollers, loosely draping a belt onto said guides, slide said belt inboard onto said belt from said guides, engage a belt-tightening mechanism in said belt module to securely attach said belt around said rollers, and in a last step, rotating said guides away from said rollers in a standby position back into said hollow pockets.

6. The method of claim 5 whereby said last step comprises reinserting said guides in said hollow housing adjacent said rollers, said guides configured to again be pulled out of said hollow pockets and placed into alignment with said rollers.

7. The method of claim 5 whereby said hollow pockets and said guides have a tear-drop shape cross section.

* * * * *